US010042950B2

(12) United States Patent
Zhu

(10) Patent No.: US 10,042,950 B2
(45) Date of Patent: Aug. 7, 2018

(54) METHOD AND APPARATUS FOR MODIFYING THE FONT SIZE OF A WEBPAGE ACCORDING TO THE SCREEN RESOLUTION OF A CLIENT DEVICE

(71) Applicant: Alibaba Group Holding Limited, George Town (KY)

(72) Inventor: Yifeng Zhu, Hangzhou (CN)

(73) Assignee: Alibaba Group Holding Limited (KY)

( * ) Notice: Subject to any disclaimer, the term of this patent is extended or adjusted under 35 U.S.C. 154(b) by 625 days.

(21) Appl. No.: 14/562,071

(22) Filed: Dec. 5, 2014

(65) Prior Publication Data

US 2015/0161287 A1 Jun. 11, 2015

Related U.S. Application Data

(63) Continuation of application No. 12/812,651, filed as application No. PCT/US2010/036246 on May 26, 2010, now Pat. No. 8,935,607.

(30) Foreign Application Priority Data

Aug. 11, 2009 (CN) .......................... 2009 1 0166509

(51) Int. Cl.
G06F 17/00 (2006.01)
G06F 17/30 (2006.01)
(Continued)

(52) U.S. Cl.
CPC ...... G06F 17/30905 (2013.01); G06F 17/212 (2013.01); G06F 17/214 (2013.01);
(Continued)

(58) Field of Classification Search
CPC ............. G06F 17/30905; G06F 17/214; G06F 17/212; G06F 17/2247; G06F 17/2264; H04L 67/02; H04L 67/2823
See application file for complete search history.

(56) References Cited

U.S. PATENT DOCUMENTS 5,001,697 A 3/1991 Torres
5,227,772 A 7/1993 Takebe
(Continued)

FOREIGN PATENT DOCUMENTS

CN 101373470 A 2/2009
JP H10133973 A 5/1998
(Continued)

OTHER PUBLICATIONS

Schmitt, C. et al.,"Profesional CSS: Cascading Style Sheets for Web Design, $2^{nd}$ Ed., Chapter 1: Best Practices for XHTML and CSS," © May 12, 2008, Wrox, pp. 1-48.*

(Continued)

Primary Examiner — Cesar Paula
Assistant Examiner — James H Blackwell
(74) Attorney, Agent, or Firm — Van Pelt, Yi & James LLP

(57) ABSTRACT

Displaying a webpage includes: receiving a first request message from a client requesting to browse a webpage; sending a second request message to the client requesting for a screen resolution adopted by the client; receiving, form the client, information indicative of the screen resolution adopted by the client; selecting a font size corresponding to the screen resolution adopted by the client according to the screen resolution adopted by the client and a predetermined correlation between screen resolutions and font sizes; generating the webpage in a scale corresponding to the screen resolution adopted by the client and the selected font size; and sending the webpage to the client.

10 Claims, 5 Drawing Sheets

(51) Int. Cl.
  *G06F 17/21* (2006.01)
  *H04L 29/08* (2006.01)
  *G06F 17/22* (2006.01)
(52) U.S. Cl.
  CPC .......... *H04L 67/02* (2013.01); *H04L 67/2823* (2013.01); *G06F 17/2247* (2013.01); *G06F 17/2264* (2013.01)

(56) References Cited

U.S. PATENT DOCUMENTS

| | | |
|---|---|---|
| 5,233,334 A | 8/1993 | Takebe et al. |
| 5,796,401 A | 8/1998 | Winer |
| 6,023,714 A | 2/2000 | Hill et al. |
| 6,167,441 A | 12/2000 | Himmel |
| 6,377,262 B1 | 4/2002 | Hitchcock et al. |
| 6,456,305 B1 | 9/2002 | Qureshi et al. |
| 6,593,944 B1 | 7/2003 | Nicolas et al. |
| 6,670,956 B2 | 12/2003 | Yoo et al. |
| 7,219,309 B2 | 5/2007 | Kaasila et al. |
| 7,461,353 B2 | 12/2008 | Rohrabaugh et al. |
| 7,599,989 B2 | 10/2009 | Stevens et al. |
| 7,788,596 B2 | 8/2010 | Iwabuchi |
| 7,900,137 B2 | 3/2011 | Ivarsøy et al. |
| 8,543,914 B2 | 9/2013 | Klassen |
| 2003/0095135 A1 | 5/2003 | Kaasila |
| 2004/0177323 A1 | 9/2004 | Kaasila et al. |
| 2004/0183817 A1 | 9/2004 | Kaasila |
| 2004/0213542 A1 | 10/2004 | Hamasaka et al. |
| 2005/0044236 A1 | 2/2005 | Stafford |
| 2005/0216846 A1 | 9/2005 | Kalenius |
| 2006/0031416 A1 | 2/2006 | Narin |
| 2006/0259859 A1 | 11/2006 | Ivarsoy et al. |
| 2006/0265417 A1 | 11/2006 | Amato et al. |
| 2007/0033522 A1 | 2/2007 | Lin et al. |
| 2007/0150829 A1 | 6/2007 | Eschbach et al. |
| 2007/0180367 A1 | 8/2007 | Chiang |
| 2007/0226612 A1 | 9/2007 | Sun |
| 2008/0028335 A1 | 1/2008 | Rohrabaugh et al. |
| 2008/0201666 A1 | 8/2008 | Park et al. |
| 2008/0281965 A1 | 11/2008 | Zhong et al. |
| 2010/0013859 A1 | 1/2010 | Robertson |
| 2010/0020104 A1 | 1/2010 | Mitsumata |

FOREIGN PATENT DOCUMENTS

| | | |
|---|---|---|
| JP | 2001236202 | 8/2001 |
| JP | 2004151853 | 5/2004 |

OTHER PUBLICATIONS

Maeda, J. et al.,"WebDigest: Layout-preserving Visual! Enhanced Web Pages," from Proc. 2003 Symp. on Applications and the Internet, COPYRGT. 2003, IEEE, 4 pages.
Butler, M. et al.,"Device Independence and the Web," .Copyrgt. 2002, IEEE, pp. 81-86.
Lie, H.W. et al.,"The Amazing Em Unit and Other CSS Best Practices," Copyrgt. Jul. 22, 2005, Informit.com, 8 pages.
W3C,"Media Queries, W3C Candidate Recommendation," dated Jun. 6, 2007, 14 pages total.
The Chinese Office Action dated May 21, 2012 for Chinese patent application No. 200910166509.2, a counterpart foreign application of U.S. Appl. No. 12/812,651, 16 pages.
Translated Chinese Office Action dated Jan. 23, 2013 for Chinese Patent Application No. 2009101665092, a counterpart foreign application of U.S. Appl. No. 12/812,651, 12 pages.

* cited by examiner

METHOD AND APPARATUS FOR MODIFYING THE FONT SIZE OF A WEBPAGE ACCORDING TO THE SCREEN RESOLUTION OF A CLIENT DEVICE

CROSS REFERENCE TO RELATED PATENT APPLICATIONS

This application is a continuation of U.S. patent application Ser. No. 12/812,651 entitled METHOD, APPARATUS AND SYSTEM FOR DISPLAYING WEBPAGES filed Jul. 13, 2010 which is incorporated herein by reference in its entirety for all purposes, which is a national stage application claiming priority to PCT Application No. PCT/US10/36246 entitled METHOD, APPARATUS AND SYSTEM FOR DISPLAYING WEBPAGES filed 26 May 2010, which is incorporated herein by reference in its entirety for all purposes, which claims priority to Chinese Patent Application No. 200910166509.2 entitled METHOD, APPARATUS AND SYSTEM FOR DISPLAYING WEBPAGES filed Aug. 11, 2009, which is incorporated herein by reference in its entirety for all purposes.

TECHNICAL FIELD

The present disclosure relates to computers and, more particularly, to displaying of webpages on computers.

BACKGROUND

While screen resolution supported by clients has been gradually improved with the development of computer technologies, the adopted value of font size for displaying webpages through web browser applications at clients has not been changed. Presently, as the default font size for all browser applications is 16 px (i.e., 16 pixels), the higher the screen resolution at a client the smaller the visual font size presented in webpages by web browser applications is smaller. This tends to lead to a more strenuous browsing experience for a web user. For instance, a 12-pixel font, when displayed under the screen resolution of 1280*1024 px or higher, the letters or components composing the text contents are relatively small and difficult for some website visitors to read, as illustrated in FIG. 1A.

The conventional approach to addressing the foregoing problem typically involves adjusting the visual font size by operating the font-size setting function provided internally by web browser applications (e.g., the font size setting in IE) or by adjusting the default displaying parameters of an operating system (e.g., adjustment of screen resolution) thereby scaling the visual font size presented by the browser to ease the user's webpages reading experience. An example of a webpage with enlarged fonts is shown in FIG. 1B. However, the above-mentioned approach can upset the originally arranged layout of a webpage and result in incomplete display of the webpage. Furthermore, in displaying Chinese characters which are in nature dot characters, the enlarged characters can become blurred. Both of these problems adversely impact a web user's reading of the adjusted webpages, and in turn deteriorate the quality of service for the website system.

SUMMARY

The following described embodiments of the present disclosure provide methods, apparatuses and systems for displaying webpages, with the attempt to enhance the display performance for the webpages.

A method for displaying webpage comprises: receiving a first request message from a client requesting to browse a webpage; sending a second request message to the client requesting for a screen resolution adopted by the client; receiving, form the client, information indicative of the screen resolution adopted by the client; selecting a font size corresponding to the screen resolution adopted by the client according to the screen resolution adopted by the client and a predetermined correlation between screen resolutions and font sizes; generating the webpage in a scale corresponding to the screen resolution adopted by the client and the selected font size; and sending the webpage to the client.

A method for displaying webpage comprises: receiving, from a client, a request to browse a webpage and information indicative of a screen resolution adopted by the client; selecting a font size corresponding to the screen resolution adopted by the client according to the screen resolution adopted by the client and a predetermined correlation between screen resolutions and font sizes; generating the webpage in a scale corresponding to the screen resolution adopted by the client and the selected font size; and sending the webpage to the client.

A website server comprises a communication module, a selection module, and a generation module.

The communication module receives from a client a first request message requesting to browse a webpage, sends a second request message to the client requesting for a screen resolution adopted by the client, and receives from the client information indicative of the screen resolution adopted by the client;

The selection module selects a font size corresponding to the screen resolution adopted by the client and a predetermined correlation between screen resolutions and font sizes; and The generation module generates a webpage in a scale corresponding to the screen resolution adopted by the client and the selected font size.

A website server comprises a communication module, a selection module, and a generation module.

The communication module receives from a client a request message including a request to browse a webpage and a screen resolution;

The selection module selects a font size according to the screen resolution and a predetermined correlation between screen resolutions and font sizes; and The generation module, according to the screen resolution and the selected font size, generates the webpage in a corresponding scale and sends the generated webpage to the client via the communication module.

A website system comprises a website server. The website server receives a first request message from a client requesting to browse a webpage, sends a second request message to the client to request for information indicative of a screen resolution adopted by the client, selects a font size according to the screen resolution and a predetermined correlation between screen resolutions and font sizes, generates the webpage in a scale corresponding to the screen resolution and the selected font size, and sends the generated webpage to the client.

A website system comprises a website server and a client. The client sends a request message to the website server requesting to browse a webpage, checks locally a screen resolution adopted by the client, and sends the screen resolution to the website server; and The website server receives the screen resolution from the client and, based on a predetermined correlation between screen resolutions and font sizes, selects a font size corresponding to the screen resolution, generating the webpage in a scale corresponding to the screen resolution and the selected font size, and sends the generated webpage to the client.

With the aforementioned technical schemes, a website server can generate webpages with font size proportionally appropriate for browsing by the user according to the currently adopted screen resolution at the client. The display performance of webpages is effectively improved, the quality of service of the website system is enhanced, and the user experience is greatly improved.

DETAILED DESCRIPTION OF PREFERRED EMBODIMENTS

To improve the quality of service of a website system and enhance the display performance of webpages, in one embodiment, a website server receives from a client a first request message requesting to browse a webpage, and sends a second request message to the client requesting for information indicative of a screen resolution. According to the screen resolution indicated by the client as well as a predetermined correlation between screen resolutions and font sizes, the website server selects a font size corresponding to the indicated screen resolution. The website server then generates a webpage in a scale corresponding to the indicated screen resolution and the selected font size, and sends the generated webpage to the client. In another embodiment, when sending a request message to a website server to request to browse a webpage, a client determines the local screen resolution and sends information indicative of the screen resolution to the website server. According to the screen resolution indicated by the client as well as a predetermined correlation between screen resolutions and font sizes, the website server selects a font size corresponding to the indicated screen resolution. The website server then generates a webpage in a scale corresponding to the indicated screen resolution and the selected font size, and sends the generated webpage to the client.

The preferred embodiments of the present disclosure will be described in detail with conjunction to the accompanying drawings.

Figure 1A:
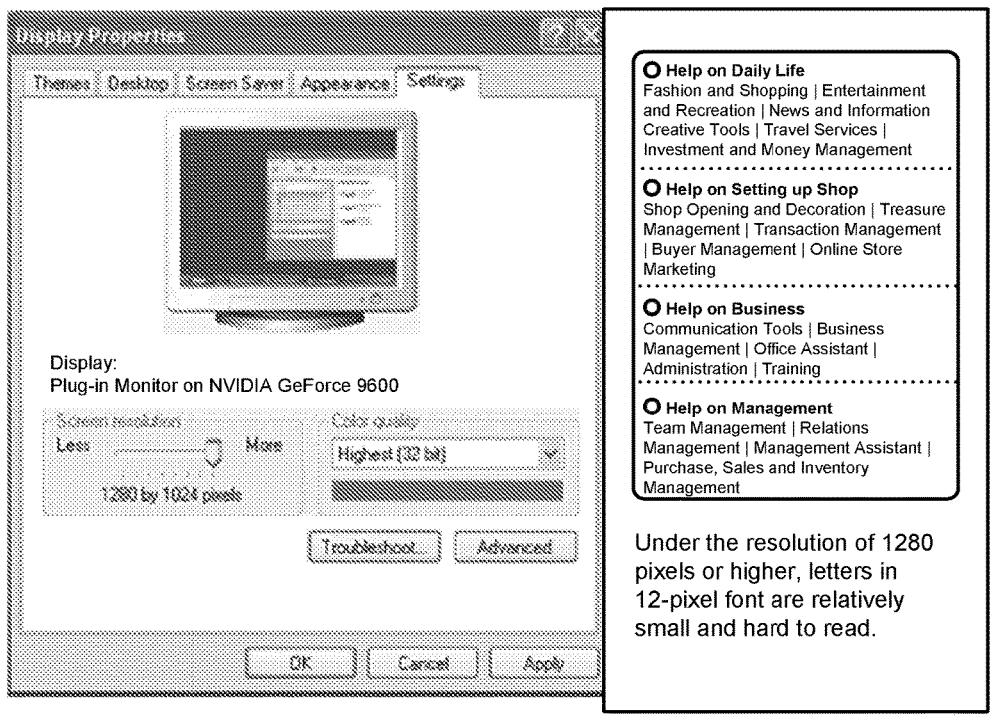
FIGS. 1A and 1B show webpages displayed using existing technologies.
Figure 1B:
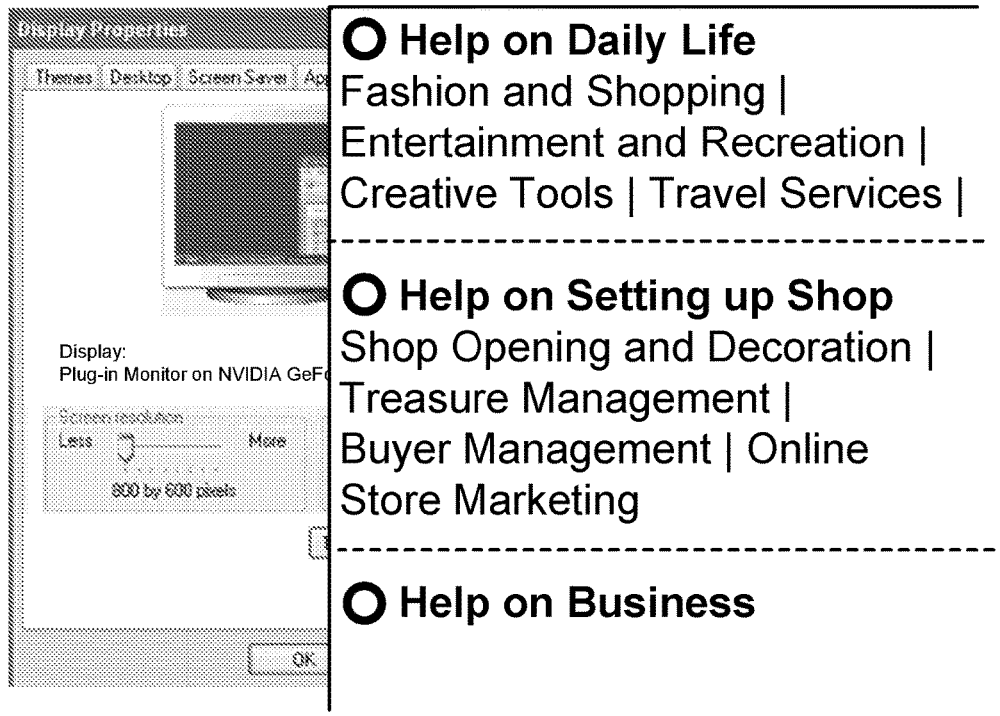
Figure 2:
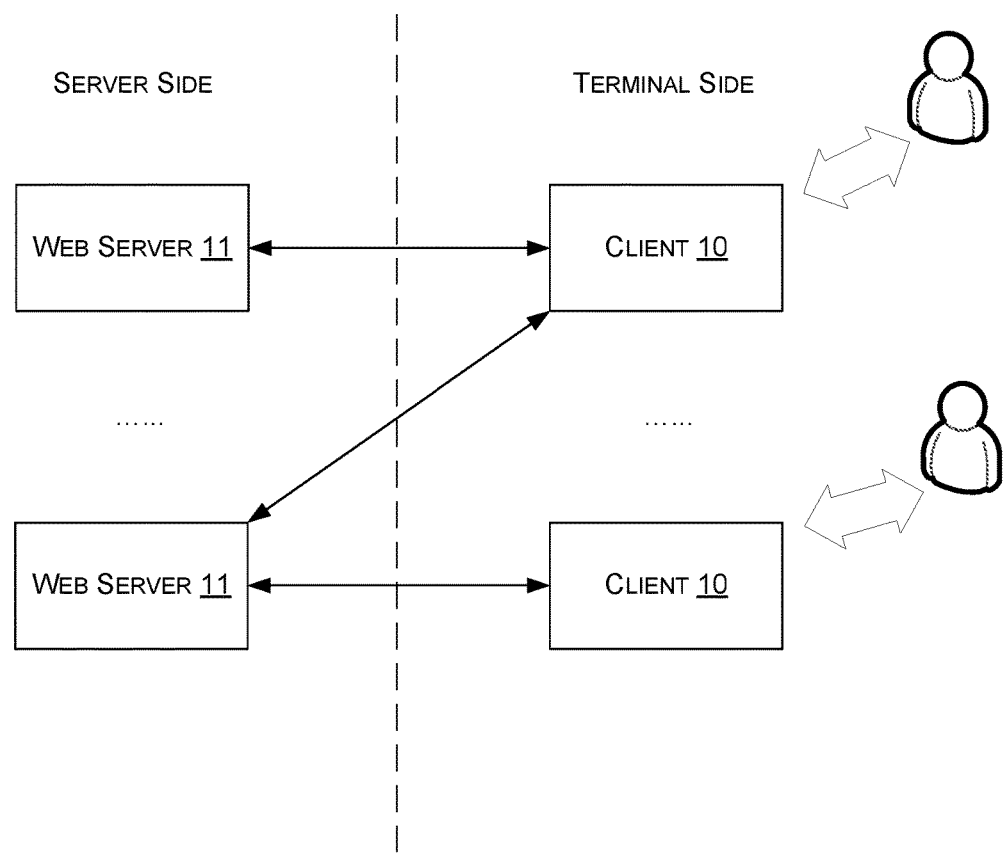
FIG. 2 is a schematic diagram of a website service system according to the present disclosure.

Referring to FIG. 2, in a first embodiment, a website service system includes a plurality of clients 10 and website servers 11.

The clients 10 send requests to the website servers 11 to request to browse webpages. For simplicity, the following description will refer to a singular website server 11 and a singular client 10.

A website server 11, after receiving a first request message requesting to browse a webpage from a client 10, sends the client 10 a second request message requesting for information indicative of a screen resolution. According to the screen resolution indicated by the client 10 as well as a predetermined correlation between screen resolutions and font sizes, the website server 11 selects a font size corresponding to the indicated screen resolution. The website server 11 then generates a webpage in a scale corresponding to the indicated screen resolution and the selected font size, and sends the generated webpage to the client 10.

Figure 3:
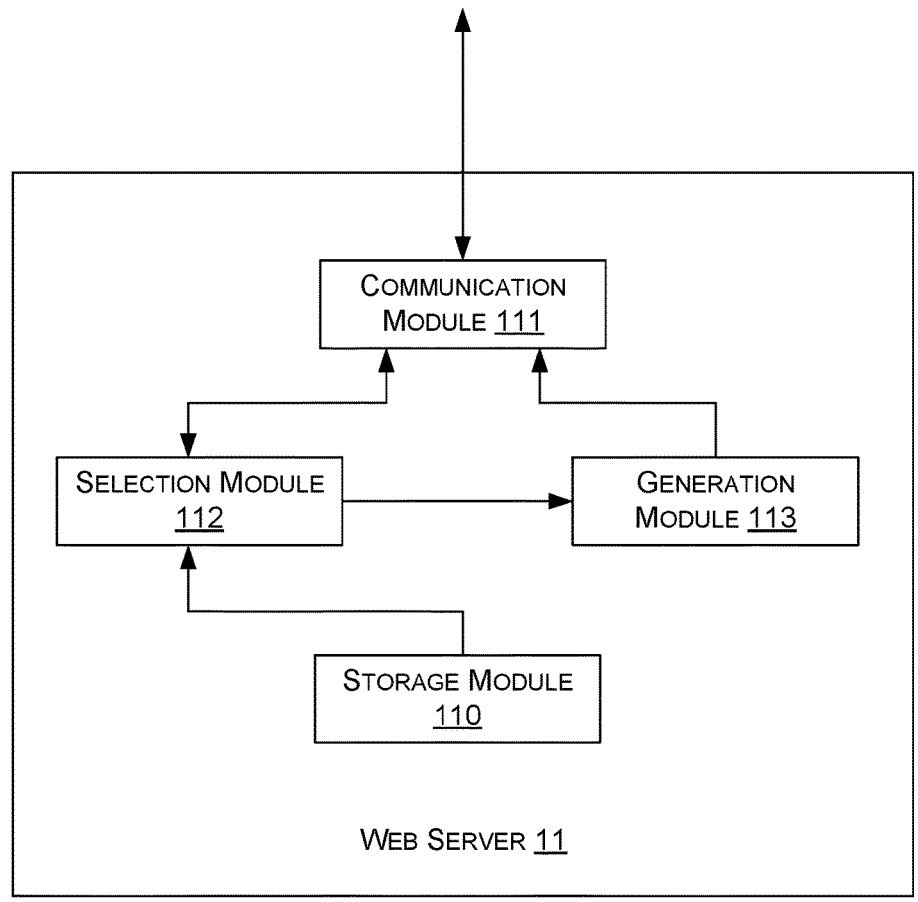
FIG. 3 is a block diagram showing a website server according to the present disclosure.

Referring to FIG. 3, in one embodiment, the website server 11 includes a storage module 110, a communication module 111, a selection module 112 and a generation module 113.

The storage module 110 stores information indicative of correlations between screen resolutions and font sizes.

The communication module 111, after receiving the first request message from the client 10 requesting to browse the webpages, sends the client 10 the second request message requesting for information indicative of a screen resolution and receives information indicative of the screen resolution provided by the client 10.

The selection module 112, according to the screen resolution indicated by the client 10 as well as a predetermined correlation between screen resolutions and font sizes, selects a font size that corresponds to the screen resolution of the client 10.

The generation module 113, according to the screen resolution as well as the selected font size, generates a webpage in a scale corresponding to the indicated screen resolution and the selected font size, and causes the generated webpage to be sent to the client 10 by the communication module 111.

In a second embodiment, a website service system includes a plurality of clients 10 and website servers 11. Here, when sending a request message to a website server 11 to request to browse a webpage, a client 10 determines the local screen resolution and sends information indicative of the screen resolution to the website server 11.

According to the screen resolution indicated by the client 10 as well as a predetermined correlation between screen resolutions and font sizes, the website server 11 selects a font size corresponding to the indicated screen resolution. The website server 11 then generates a webpage in a scale corresponding to the indicated screen resolution and the selected font size, and sends the generated webpage to the client 10.

Based on the foregoing systematic structure, in various embodiments, it is necessary to predefine in the website server 11 a correlation between screen resolutions and font sizes. This can be done, for example, by means of the technology of cascading style sheet (CSS). CSS is a style sheet-based technology, and when adopted for webpage development, effectively achieves accurate control of the layout, fonts, colors, background and other effects of the webpage. In one embodiment, CSS is used to define the font size expressed in units of "em" at the time the screen resolutions and font sizes are initially set. Therein, "em" is a relative unit that describes the font size of letters or characters with respect to the current object. If the font size(s) of text in the current object is not manually set, relative unit is defined with respect to the default font size of the related browser application, similar to a percentage. For example, in the existing technology, most conventional browser applications adopt the standard of a font size that 1 em=16 px. Analogously, it can be derived that 14 px=0.875 em, 12 px=0.75 em, and 10 px=0.625 em. To simplify the conversion, preferably, a body selector is employed to set attributes for webpage elements. The body selector applies default rules to all the webpage elements in light of the inheritance mechanism, so as to endow the webpage elements with attributes such as font style, color, size, frame appearance, padding and so on. In one embodiment, it is preset through the body selector of CSS that font size=62.5%, so as to change the font size for the browser in the following manner: 16 px*62.5%=10 px. At this time, the value conversion for 1 em is 10 px, meaning that it is only required to divide the value of the original font size expressed in 'px" by 10 and change the unit into em. An exemplary implementation is described as follows (where font-family indicates the font style, font-size indicates the font size, TD indicates the font size in tables and light-height indicates the line spacing):

Font-family: Microsoft YaHei Font, Lucida Grande, Tahoma, SimSun;
Font-size: 62.5%
TD: 1.2-1.8 em (or 120%-180%)
Light-height: 1.6-2 em (or 160%-200%)

Expressing the font sized in em provides the following features. First, the value in em is not absolute because em inherits the font size from a related parent element, and is applicable to an IE browser for font size scaling. Since em is a relative size unit, a user may modify the font size in terms of em according to individual needs. In comparison, a font size set in units of pixels does not allow modification by a user. Thus, the em expression is flexible and adaptive to more application demands, thereby increasing the quality of service of the overall website system.

Figure 4:
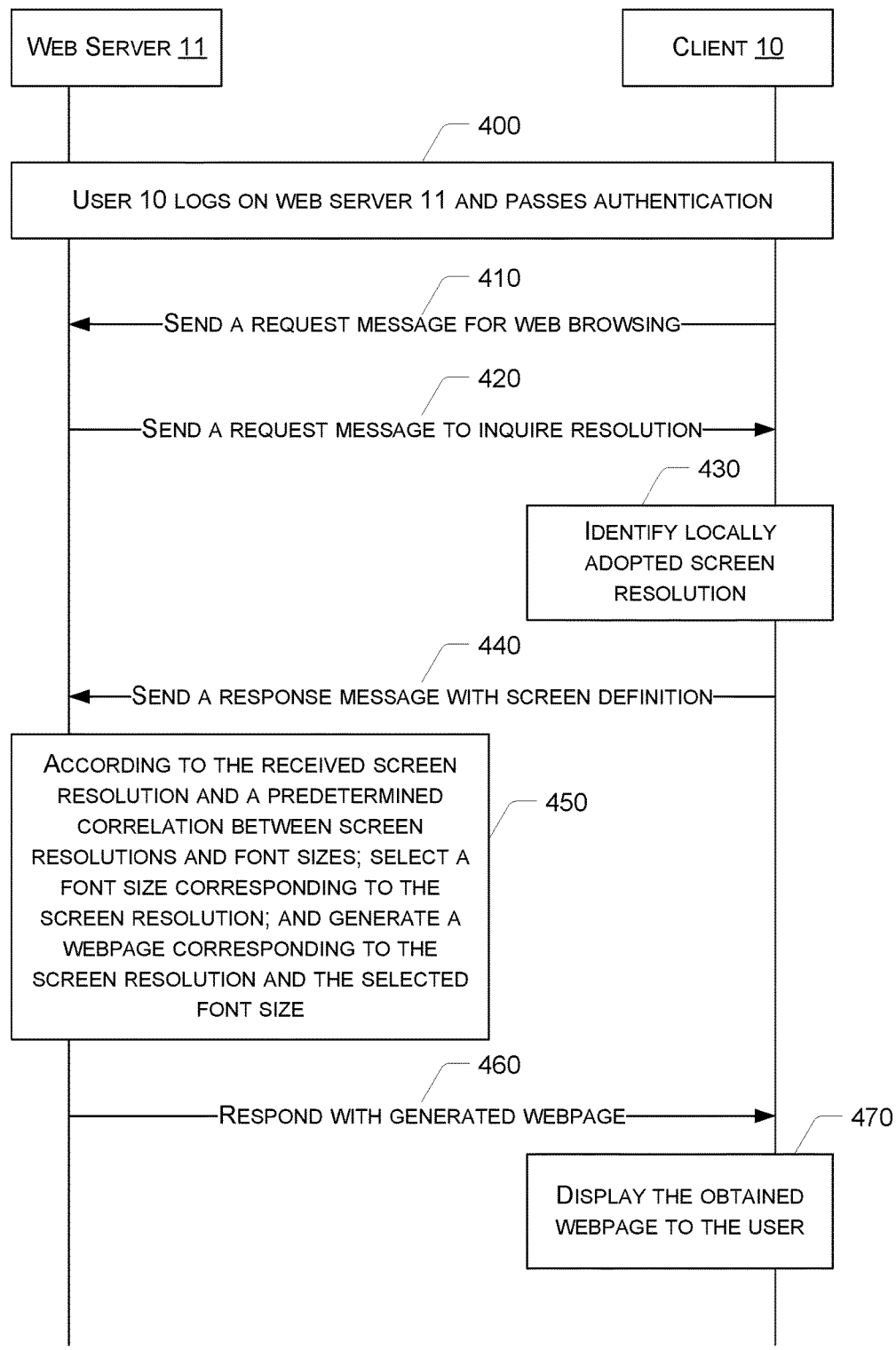
FIG. 4 is a flow chart of a process of a website server providing a webpage to a client according to the present disclosure.

After initial definition, when receiving a request for webpage browsing from the client 10, the website server 11 first identifies the screen resolution at the client 10. The website server 11 then, according to a predetermined correlation between the preset screen resolutions and font sizes, generates the webpage with a corresponding scale and sends the generated webpage to the client 10. FIG. 4 illustrates a detailed flow path of a process for the website server 11 to display the corresponding webpage to the client 10 according to the screen resolution of the client 10 as provided in the first embodiment. The process includes actions as described below.

At 400, the client 10 logs on the website server 11 and passes authentication.

In practical applications, after the client 10 passes the authentication by the website server 11 the client 10 is allowed to access various services provided by the website server 11, such as browsing pages or downloading files.

At 410, the client 10, according to a respective user's direction, sends a request message for webpage browsing to the website server 11.

In one embodiment, the request message for webpage browsing carries an URL address of the webpage that the user requests to browse.

At 420, upon receiving the request message for webpage browsing from the client 10, the website server 11 sends a request message to the client 10 to inquire about the screen resolution.

At 430, the client 10 receives the request message inquiring about its screen resolution, and identifies the locally adopted screen resolution at the present time, which is hereinafter referred to as Resolution 1.

At 440, the client 10 incorporates the identified Resolution 1 in its response to the request message from the website server 11 and sends the response to the website server 11.

At 450, the website server 11, according to the received Resolution 1 as well as a predetermined correlation between screen resolutions and font sizes, obtains Font Size 1 according to Resolution 1. The website server 11 then generates a webpage, hereinafter referred to as Webpage 1, with a corresponding scale according to Resolution 1 and Font Size 1.

At 450, for the website server 11 to generate the webpage, it is necessary to add webpage elements (e.g., text, links and images) obtained from the received URL address to the scaled webpage. For example, pixel-based size of the obtained text may be determined according to Font Size 1 for displaying, and the text may be arranged in the page according to the pixel-based size. As another example, the obtained images may be adjusted or trimmed according to Font Size 1 to match the text arrangement in the webpage.

In practical applications, since Chinese characters are dot characters, when they are displayed in browser applications with a font size smaller than 12 pixels there tends to be an issue of loss of stroke in the displayed Chinese characters. When font size is between 12 pixels and 18 pixels, the displaying performance is relatively optimal on condition that the font size is an integral multiple of pixels. Thus, preferably in one embodiment, a predetermined correlation between screen resolutions and font sizes is set according to the following: under the screen resolution of 800*600 or 1024*768, the default font size is defined as "1.2 em", equal to 12 pixels; under the screen resolution of 1280*1024, the default font size is defined as "1.4 em", equal to 14 pixels; and under the screen resolution of 1920*1600 or higher, the default font size is defined as "1.6 em", equal to pixels. The above setting is intended to be an example only.

At 460, the website server 11 sends the generated Webpage 1 to the client 10.

At 470, the client 10 displays the obtained Webpage 1 to the user.

Based on the embodiment described above, a user is allowed to customize the font size according to practical needs when browsing webpages via the client 10.

For instance, when the screen resolution currently adopted at the client 10 is 1280*1024, the user requests the website server 11 via the client 10 to set the font size at 2 em. In the event that the font size corresponding to the screen resolution of 1280*1024 at the web side is 1.4 em, which is smaller than 2 em, the website server 11 ignores the font size preset at the web side and adopts the user's request, i.e., 2 em, to generate the webpage.

In another example, when the screen resolution currently adopted at the client 10 is 1280*1024, the user requests the website server 11 via the client 10 to set the font size at 1 em. In the event that the font size corresponding to the screen resolution of 1280*1024 at the web side is 1.4 em, which is greater than 1 em, the website server 11 may directly follow the user's request to use 1 em and the screen resolution of 1280*1024 to generate the webpage of a corresponding scale. Alternatively, the website server 11 may provide a prompt to inform the user that the currently selected font size is not the preferred value for the designated screen resolution, and if the user insists on 1em, the website server 11 generates the webpage with the font size of 1 em accordingly. If the user resets the font size at 1.5 em, the website server 11 generates the webpage with a corresponding scale according to 1.5 em and 1280*1024 screen resolution.

On the other hand, in one embodiment, after providing the client 10 with Webpage 1 that meets the user's needs, the website server 11 may then regularly send a request message to inquire about the latest screen resolution at the client 10 so as to be updated with any change of the screen resolution adopted by the client 10 in order to adjust the webpage currently viewed by the user. In addition, when the user changes the screen resolution at the client 10, the client 10 may actively update the website server 11 to request the website server 11 to adjust the webpage currently viewed by the user according to the newly set screen resolution.

In one embodiment, after confirming that the user has reset the screen resolution at the client 10, various options by which the website server 11 adjusts the webpage currently viewed by the user include, but are not limited to, those described below.

1. The website server 11 obtains the font size corresponding a user-set screen resolution according to the screen resolution set by the user and a predetermines correlation between screen resolutions and font sizes, generates a webpage with a corresponding scale according to the obtained font size and related webpage elements, and sends the generated webpage to the client 10.

2. The website server 11 instructs the client 10 to scale the webpage by a ratio that is proportional to a ratio between the screen resolution currently set by the user and the previous screen resolution.

In the second embodiment, the client 10 proactively identifies the local screen resolution and informs the website server 11. The website server 11 presents a generated webpage to the client 10 according to a process that includes actions described below.

Figure 5:
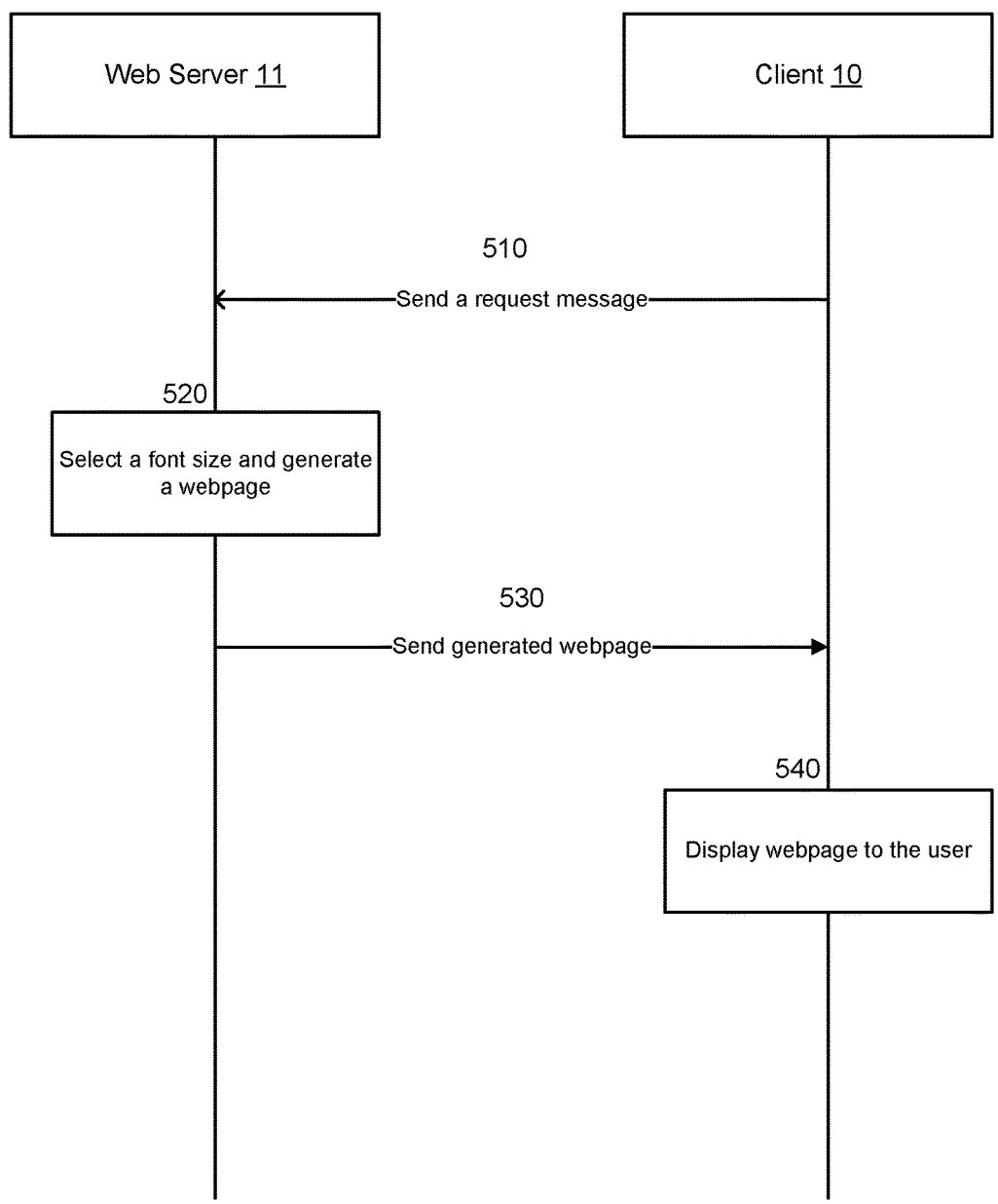
FIG. 5 is a flow chart of another process of a website server providing a webpage to a client according to the present disclosure.

FIG. 5 is a flow chart of another process of a website server providing a webpage to a client according to the present disclosure.

At 510, while sending the request message for webpage browsing to the website server 11, the client 10 proactively identifies its screen resolution, and informs the website server 11 of the screen resolution.

The client 10 may incorporate its screen resolution in the request message requesting for webpage browsing it sends to the website server 11, or it may send a separate request message to inform the website server 11 of its screen resolution.

At 520, the website server 11, according to the received screen resolution of the client 10 and a predetermined correlation between screen resolutions and font sizes, selects the font size corresponding to the screen resolution setting of client 10, and generates the webpage according to the screen resolution and the font size.

At 530, the website server 11 sends the generated webpage to the client 10.

At 540, the client 10 displays the obtained webpage to the user.

In summary, by implementing the technical schemes described in the present disclosure, the website server 11 is enabled to generate webpages according to different screen resolutions adopted by individual clients 10 with the font sizes and scales to facilitate optimal viewing of webpages by individual users. This effectively improves the display performance of the webpages, enhances the quality of service of the website system, and significantly improves user experience. Moreover, the website server 11 is enabled to adjust the generated webpages in scale according to any change of screen resolution taking place at the client 10, and to customize a webpage with a user-defined scale by using a user-defined font size and the screen resolution currently adopted by the client 10. The present disclosure thus enhance the flexibility of website services and better adapt to the various needs of the users, thereby further enhancing the quality of service of the website system and improving the user experience.

While the present disclosure is herein described by referring to the flowcharts of the methods, equipment (systems) and program products, it would be appreciated that each of the steps and/or blocks in the flowcharts and/or block diagrams and any combination of the steps and/or blocks in the flowcharts and/or block diagrams may be accomplished by means of commands for computer programs. These commands may be provided to general computers, special-purpose computers, inlaid processors or processors of other programmable data processing devices so as to provide a machine that allows the commands executed by the computers or processors of other programmable data processing devices to realize an apparatus having the functions of one or more steps and/or blocks in one or more flowcharts and/or block diagrams.

The commands for computer programs may be stored in one or more computer-readable storage media that direct computers or processors of other programmable data processing devices to work in predetermined ways, so as to allow the commands stored in the one or more computer-readable storage media to generate products containing commanding devices to realize the functions of one or more steps and/or blocks in one or more flowcharts and/or block diagrams.

The commands for computer programs may be also loaded to computers or other programmable data processing devices so as to conduct a series of operational steps on the computers or other programmable data processing devices, thereby producing computer-based processing, and in turn providing the commands executed on the computers or other programmable data processing devices in order to realize the functions of one or more steps and/or blocks in one or more flowcharts and/or block diagrams.

The present disclosure has been described with reference to the preferred embodiments and it is understood that the embodiments are not intended to limit the scope of the present disclosure. Moreover, as the contents disclosed herein should be readily understood and can be implemented by a person skilled in the art, all equivalent changes or modifications which do not depart from the concept of the present disclosure should be encompassed by the appended claims.

What is claimed is:

1. A method of displaying a webpage, comprising:
receiving a first request message from a client requesting to browse a webpage and information indicative of a screen resolution adopted by the client;
selecting a font size corresponding to the screen resolution adopted by the client according to the screen resolution adopted by the client and predetermined correlations between screen resolutions and font sizes;
generating the webpage in a scale corresponding to the screen resolution adopted by the client and the selected font size, wherein:
the selected font size relates to a first proportion of the screen resolution;
an attribute of a webpage element of the webpage relates to a second proportion of the screen resolution, the attribute of the webpage element including a table font size of text in a table, a line spacing, or a combination thereof;
sending the webpage to the client;

when the screen resolution is reset to a user-set screen resolution at a time after sending the webpage to the client:
  obtaining a ratio between the user-set screen resolution and the screen resolution adopted by the client prior to resetting; and
  causing a webpage displayed at the client to be proportionally scaled according to the ratio; and
upon receiving a second request message from the client indicative of the font size being reset to a user-set font size at a time after the webpage has been sent to the client, generating a revised webpage in a scale according to the screen resolution adopted by the client and the user-set font size, wherein the revised webpage includes a revised attribute of the webpage element, and wherein a size of the revised attribute of the webpage element is different from a size of the attribute of the webpage element.

2. The method of claim 1, wherein generating the revised webpage in a scale corresponding to the screen resolution adopted by the client and the user-set font size comprises:
  comparing the user-set font size and a predetermined font size corresponding to the screen resolution adopted by the client; and
  when the user-set font size is larger than the predetermined font size corresponding to the screen resolution adopted by the client, generating the revised webpage in the scale corresponding to the screen resolution adopted by the client and the user-set font size.

3. The method of claim 1, further comprising:
before receiving the first request message, establishing the predetermined correlations between screen resolutions and font sizes, the font sizes being expressed in units of em.

4. The method of claim 1, wherein:
a first attribute of the webpage element of the webpage relates to a third proportion of the screen resolution; and
a second attribute of the webpage element of the webpage relates to a fourth proportion of the screen resolution, the third proportion being different from the fourth proportion, the third proportion and the fourth proportion both being different from the first proportion.

5. A website server, comprising:
a processor; and
a memory coupled with the processor, wherein the memory is configured to provide the processor with instructions which when executed cause the processor to:
  receive from a client a first request message requesting to browse a webpage and information indicative of a screen resolution adopted by the client;
  select a font size corresponding to the screen resolution adopted by the client and a predetermined correlation between screen resolutions and font sizes; and
  generate a webpage in a scale corresponding to the screen resolution adopted by the client and the selected font size, wherein:
    the selected font size relates to a first proportion of the screen resolution;
    an attribute of a webpage element of the webpage relates to a second proportion of the screen resolution, the attribute of the webpage element including a table font size of text in a table, a line spacing, or a combination thereof;
    when the screen resolution is reset to a user-set screen resolution at a time after sending the webpage to the client:
      obtain a ratio between the user-set screen resolution and the screen resolution adopted by the client prior to resetting, and
      cause a webpage displayed at the client to be proportionally scaled according to the ratio; and
    upon receiving a second request message from the client indicative of the font size being reset to a user-set font size at a time after the webpage has been sent to the client, generate a revised webpage in a scale according to the screen resolution adopted by the client and the user-set font size, wherein the revised webpage includes a revised attribute of the webpage element, and wherein a size of the revised attribute of the webpage element is different from a size of the attribute of the webpage element.

6. The website server of claim 5, wherein generating the revised webpage in a scale corresponding to the screen resolution adopted by the client and the user-set font size comprises:
  comparing the user-set font size and a predetermined font size corresponding to the screen resolution adopted by the client; and
  when the user-set font size is larger than the predetermined font size corresponding to the screen resolution adopted by the client, generating the revised webpage in the scale corresponding to the screen resolution adopted by the client and the user-set font size.

7. The website server of claim 5, further comprising:
before receiving the first request message, establishing the predetermined correlations between screen resolutions and font sizes, the font sizes being expressed in units of em.

8. A website system, comprising:
a website server that:
  receives a first request message from a client requesting to browse a webpage and information indicative of a screen resolution adopted by the client, selects a font size according to the screen resolution and a predetermined correlation between screen resolutions and font sizes, generates the webpage in a scale corresponding to the screen resolution and the selected font size, and sends the generated webpage to the client, wherein:
    the selected font size relates to a first proportion of the screen resolution;
    an attribute of a webpage element of the webpage relates to a second proportion of the screen resolution, the attribute of the webpage element including a table font size of text in a table, a line spacing, or a combination thereof;
  when the font size is reset to a user-set font size, generates a first revised webpage in a scale corresponding to the screen resolution adopted by the client and the user-set font size;
  when the screen resolution is reset to a user-set screen resolution, selects a new font size corresponding to the user-set screen resolution based on the predetermined correlation between screen resolutions and font sizes, and generates a second revised webpage in a scale corresponding to the user-set screen resolution and the new font size;
  when the screen resolution is reset to a user-set screen resolution, obtains a ratio between the user-set screen resolution and the screen resolution adopted by the client prior to resetting, and causes a webpage displayed at the client to be proportionally scaled according to the ratio; and upon receiving a second request message from the client indicative of the font size being reset to a user-set font size at a time after the webpage has been sent to the client, generates a revised webpage in a scale according to the screen resolution adopted by the client and the user-set font size, wherein the revised webpage includes a revised attribute of the webpage element, and wherein a size of the revised attribute of the webpage element is different from a size of the attribute of the webpage element, wherein the website server includes a processor.

9. The website system of claim 8, wherein generating the revised webpage in a scale corresponding to the screen resolution adopted by the client and the user-set font size comprises:

comparing the user-set font size and a predetermined font size corresponding to the screen resolution adopted by the client; and when the user-set font size is larger than the predetermined font size corresponding to the screen resolution adopted by the client, generating the revised webpage in the scale corresponding to the screen resolution adopted by the client and the user-set font size.

10. The website system of claim 8, wherein the website server before receiving the first request message, establishes the predetermined correlations between screen resolutions and font sizes, the font sizes being expressed in units of em.

\* \* \* \* \*